(12) United States Patent
Tambasco

(10) Patent No.: US 11,714,235 B2
(45) Date of Patent: Aug. 1, 2023

(54) POLARIZATION BEAM SPLITTER

(71) Applicant: Cisco Technology, Inc., San Jose, CA (US)

(72) Inventor: Jean-Luc Joseph Tambasco, Macungie, PA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/521,353

(22) Filed: Nov. 8, 2021

(65) Prior Publication Data

US 2023/0146759 A1    May 11, 2023

(51) Int. Cl.
G02B 6/12        (2006.01)
G02B 6/126       (2006.01)

(52) U.S. Cl.
CPC ...... *G02B 6/126* (2013.01); *G02B 2006/1215* (2013.01); *G02B 2006/12061* (2013.01)

(58) Field of Classification Search
CPC .................................................. G02B 6/1228
See application file for complete search history.

(56) References Cited

U.S. PATENT DOCUMENTS

| 4,998,793 | A | 3/1991 | Henry et al. | |
|---|---|---|---|---|
| 7,373,042 | B2 * | 5/2008 | Little | G02B 6/126 385/11 |
| 10,036,851 | B1 | 7/2018 | Peng et al. | |
| 10,996,398 | B1 * | 5/2021 | Bian | G02B 6/2773 |
| 2005/0254128 | A1 * | 11/2005 | Watts | G02B 27/283 359/558 |
| 2006/0198566 | A1 | 9/2006 | Watts | |
| 2015/0338577 | A1 * | 11/2015 | Shi | G02B 6/125 385/11 |
| 2017/0052315 | A1 | 2/2017 | Barwicz et al. | |
| 2018/0314005 | A1 | 11/2018 | Lin et al. | |
| 2021/0405308 | A1 * | 12/2021 | Bhargava | H04B 10/6151 |

OTHER PUBLICATIONS

Dominic F. Siriani et al., "Adiabatic guided wave optics—a toolbox of generalized design and optimization methods", Optics Express, vol. 29, No. 3, Jan. 19, 2021, 15 pages.

Qilong Tan et al., "A Plasmonic based Ultracompact Polarization Beam Splitter on Silicon-on-Insulator Waveguides", Scientific Reports, Jul. 16, 2013, 5 pages.

(Continued)

*Primary Examiner* — Charlie Y Peng
(74) *Attorney, Agent, or Firm* — Edell, Shapiro & Finnan, LLC

(57) ABSTRACT

A first waveguide and a second waveguide including a first layer and a second layer are provided. In a first longitudinal segment, the first layer gradually approaches a first waveguide in a first transverse direction. In a second longitudinal segment, the first and second waveguides are longitudinally oriented. In a third longitudinal segment, the first layer includes a length portion having a width in the first transverse direction that gradually decreases along the third longitudinal segment, and the second layer includes a length portion having a width in the first transverse direction that gradually increases along the third longitudinal segment.

20 Claims, 12 Drawing Sheets

(56) References Cited

OTHER PUBLICATIONS

Fan Zhang et al., "Compact broadband polarization beam splitter using a symmetric directional coupler with sinusoidal bends", Optics Letters, vol. 42, Issue 2, Jan. 10, 2017, 3 pages.
Zhan Su et al., "Four-port integrated polarizing beam splitter", Optics Letters, vol. 39, Issue 4, Feb. 11, 2014, 3 pages.
Global Foundries, "GlobalFoundries Silicon Photonics Platform" Japan SOI Design Workshop, Oct. 25 & 26, 2018, 16 pages.
MIWV, "Understanding TEM, TE, and TM Waveguide Modes", retrieved Sep. 28, 2021, 6 pages.
Farhan Rana, "Integrated Optical Waveguides", Semiconductor Optoelectronics, Chapter 8, retrieved from Internet Sep. 28, 2021, 14 pages.
Ken Giewont, "GlobalFoundries Silicon Photonics Test Capabilities Overview", EPIC Online Technology Meeting on PIC, Testing-Global Foundries, Nov. 16, 2020, 5 pages.
Electronics Notes, "Waveguide Modes: TE, TM, TEM . . . ", retrieved from Internet Jul. 16, 2021, 3 pages.

* cited by examiner

POLARIZATION BEAM SPLITTER

TECHNICAL FIELD

The present disclosure relates to waveguides.

BACKGROUND

A Polarization Beam Splitter (PBS) is a device that splits light in a waveguide based on the polarization state of the light. That is, a PBS can convert a single waveguide carrying two polarizations into two individual waveguides each carrying one polarization. PBSs are also known as polarization multiplexers.

DESCRIPTION OF EXAMPLE EMBODIMENTS

Overview

In one example embodiment, a polarization beam splitter apparatus is provided that comprises first waveguide and a second waveguide. The second waveguide includes a first layer and a second layer. In a first longitudinal segment, the first layer gradually approaches the first waveguide in a first transverse direction, and the first layer is offset from the first waveguide in the first transverse direction by a first gap and in a second transverse direction by a second gap. In a second longitudinal segment, the first and second waveguides are longitudinally oriented, and the second layer is offset from the first waveguide in the first transverse direction by a third gap and is offset from the first layer in the second transverse direction by a fourth gap. In a third longitudinal segment, the first layer includes a length portion having a width in the first transverse direction that gradually decreases along the third longitudinal segment, and the second layer includes a length portion having a width in the first transverse direction that gradually increases along the third longitudinal segment.

Example Embodiments

Presented herein is an optimized Polarization Beam Splitter (PBS). The PBS may be capable of handling high optical power applications. The PBS may comprise a photonic component configured to separate vertically-polarized light and horizontally-polarized light in one waveguide into two separate waveguides carrying the respective polarizations. For example, the PBS may be designed to adiabatically convert a single waveguide carrying both Transverse Electric (TE)-polarized light and Transverse Magnetic (TM)-polarized light (e.g., TE0 and TM0 signals), into two individual waveguides, one waveguide carrying the TE mode signal and the other waveguide carrying the TM mode signal.

Figure 1A:
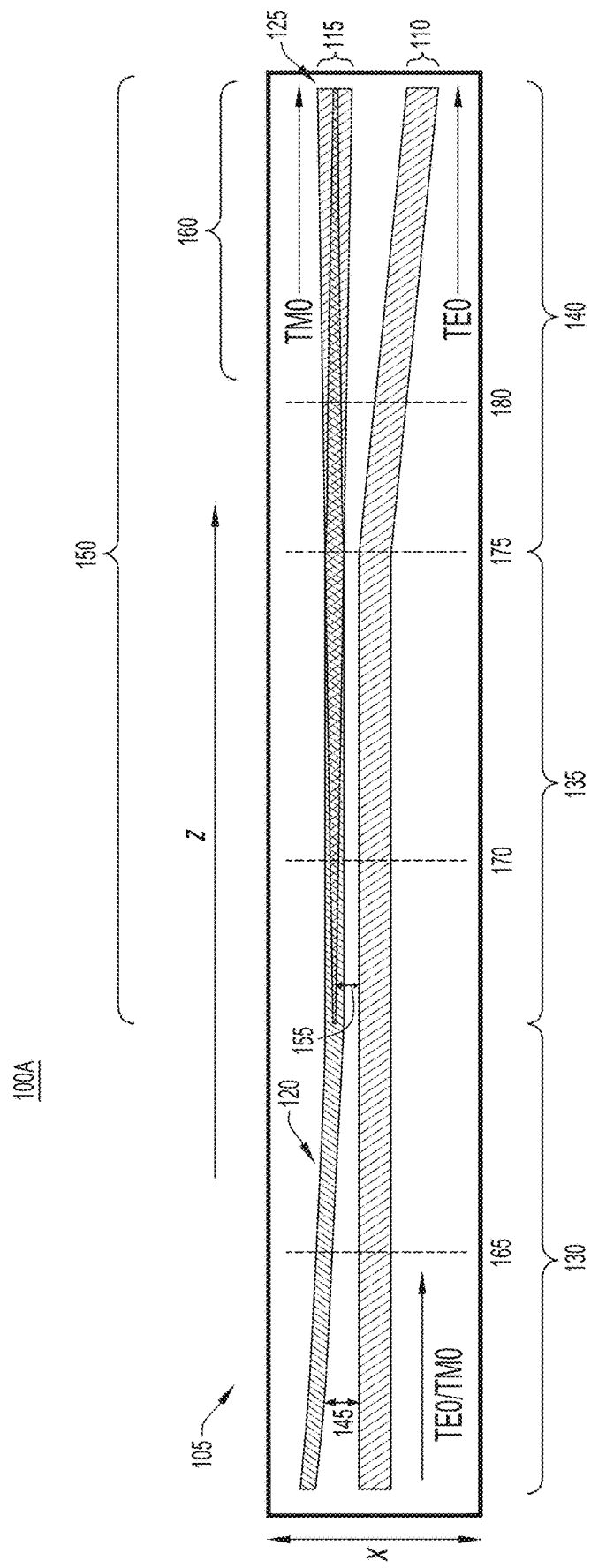
FIGS. 1A and 1B illustrate respective cross-sectional views of a Polarization Beam Splitter (PBS), according to an example embodiment.

FIG. 1A illustrates example cross-sectional view 100A of PBS 105. PBS 105 includes waveguide 110 and waveguide 115. Waveguide 115, in turn, includes layer 120 and layer 125. FIG. 1A denotes a longitudinal direction of PBS 105 as 'z' and a first transverse direction of PBS 105 as 'x.' PBS 105 includes longitudinal segment 130, longitudinal segment 135, and longitudinal segment 140. Longitudinal segment 135 is adjacent to longitudinal segment 130, and longitudinal segment 140 is adjacent to longitudinal segment 135.

In longitudinal segment 130, layer 120 gradually approaches waveguide 110 in the first transverse direction, and layer 120 is offset from waveguide 110 in the first transverse direction by gap 145. Gap 145 decreases as layer 120 gradually approaches waveguide 110 in the first transverse direction. As discussed below in connection with FIG. 1B, in longitudinal segment 130, layer 120 is also offset from waveguide 110 in a second transverse direction by a gap.

In longitudinal segment 135, waveguides 110 and 115 are longitudinally oriented. That is, layer 120 may cease gradually approaching waveguide 110 in the first transverse direction such that waveguides 110 and 115 are oriented substantially in the longitudinal direction. In this example, layer 125 is introduced at the border of longitudinal segments 130 and 135. Layer 125 is offset from waveguide 110 in the first transverse direction by gap 155. Layer 125 includes length portion 150, which has a width in the first transverse direction that gradually increases along longitudinal segment 135. As discussed below in connection with FIG. 1B, in longitudinal segment 135, layer 125 is also offset from waveguide 110 in a second transverse direction by a gap.

In longitudinal segment 140, waveguide 110 branches away from waveguide 115, while waveguide 115 remains longitudinally oriented. Also, because length portion 150 extends into longitudinal segment 140, layer 125 has a width in the first transverse direction that gradually increases along longitudinal segment 140. Layer 120 includes length portion 160, which has a width in the first transverse direction that gradually decreases along longitudinal segment 140 (e.g., to zero).

FIG. 1A also shows longitudinal cross-sections 165, 170, 175, and 180. Longitudinal cross-section 165 is in longitudinal segment 130; longitudinal cross-section 170 is in longitudinal segment 135; longitudinal cross-section 175 is at the border of longitudinal segments 135 and 140; and longitudinal cross-section 180 is in longitudinal segment 140. Longitudinal cross-sections 165, 170, 175, and 180 are discussed in greater detail below in connection with FIG. 2.

In one example, waveguide 110 may be provided with a TE mode signal polarized in the first transverse direction and a TM mode signal polarized in the second transverse direction. PBS 105 may split the TE mode and TM mode signals such that waveguide 110 carries the TE mode signal and waveguide 115 carries the TM mode signal. The TE mode signal may be obtained from waveguide 110, and the TM mode signal may be obtained from layer 125. For instance, as illustrated in FIG. 1A, PBS 105 may split a combined TE0/TM0 mode signal carried in waveguide 110 into a TM0 mode signal carried in layer 125 and a TE0 mode signal carried in waveguide 110.

While PBS 105 may be configured to split TE- and TM-polarized light across multiple waveguides, it will be appreciated that PBS 105 may also/alternatively be used combine TE- and TM-polarized light across multiple waveguides. That is, PBS 105 may be used for general-purpose polarization multiplexing onto a single waveguide or de-multiplexing from a single waveguide at high powers. Thus, PBS 105 may function as a Polarization Beam Combiner (PBC). For example, consider TM and TE mode signals that are propagating in the right-to-left direction of FIG. 1A. If the TM mode signal is provided in layer 125 and the TE mode signal is provided in waveguide 110, PBS 105 (which is now functioning as a PBC) may output the TM and TE mode signals via waveguide 110. Other embodiments may be envisioned.

PBS 105 may be constructed from any suitable material(s). For instance, waveguide 110 may be a silicon nitride (SiN) waveguide, layer 125 may be a SiN layer, and layer 120 may be a silicon (Si) layer or SiN layer. If layer 120 is a SiN layer, PBS 105 may be referred to as a bilayer-SiN platform. Implementing layer 120 as a SiN layer may further increase the high power-handling capabilities of PBS 105, lower insertion loss, and shorten the longitudinal length of PBS 105 due to increased TM mode signal confinement.

PBS 105 may be of any suitable length in the longitudinal direction. The length of PBS 105 in the longitudinal direction may be the sum of the longitudinal lengths of longitudinal segments 130, 135, and 140. In one example, the length of PBS 105 in the longitudinal direction may be approximately 150-250 μm (e.g., approximately 200 μm). 200 μm may be a reasonable longitudinal length for a SiN device configured to handle TM polarized light.

Waveguide 110, layer 120, and layer 125 may have any suitable width in the first transverse direction. In one example, waveguide 110 may have a constant width in the first transverse direction (e.g., approximately 1 μm). Because layer 125 includes length portion 150, which has a width in the first transverse direction that gradually increases along longitudinal segments 135 and 140, layer 125 may have a variable width in the first transverse direction. In one example, layer 125 may have a width in the first transverse direction less than 1 μm when layer 125 is first introduced at the border of longitudinal segments 130 and 135.

Similarly, because layer 120 includes length portion 160, which has a width in the first transverse direction that gradually decreases along longitudinal segment 140, layer 120 may have a variable width in the first transverse direction. In one example, layer 120 may have a width in the first transverse direction greater than 250 nm in longitudinal segments 130 and 135. In longitudinal segment 140, the width of layer 120 in the first transverse direction may gradually decrease along length portion 160 (e.g., to zero).

Waveguide 110, layer 120, and layer 125 may have any suitable thickness in the second transverse direction. The thicknesses in the second transverse direction of waveguide 110, layer 120, and layer 125 may be constant. For example, waveguide 110 and layer 125 may have thicknesses in the second transverse direction of approximately 200-250 nm. The thicknesses in the second transverse direction of waveguide 110 and layer 125 may be the same.

The thickness in the second transverse direction of layer 120 may be selected such that PBS 105 can operate effectively at high optical powers. If layer 120 is a Si layer, layer 120 may have a thickness in the second transverse direction of approximately 110 nm. If layer 120 is a SiN layer, layer 120 may have a thickness in the second transverse direction of approximately 200-250 nm. In one example, if layer 120 is a SiN layer, the thicknesses in the second transverse direction of waveguide 110, layer 120, and layer 125 may be the same.

Figure 1B:
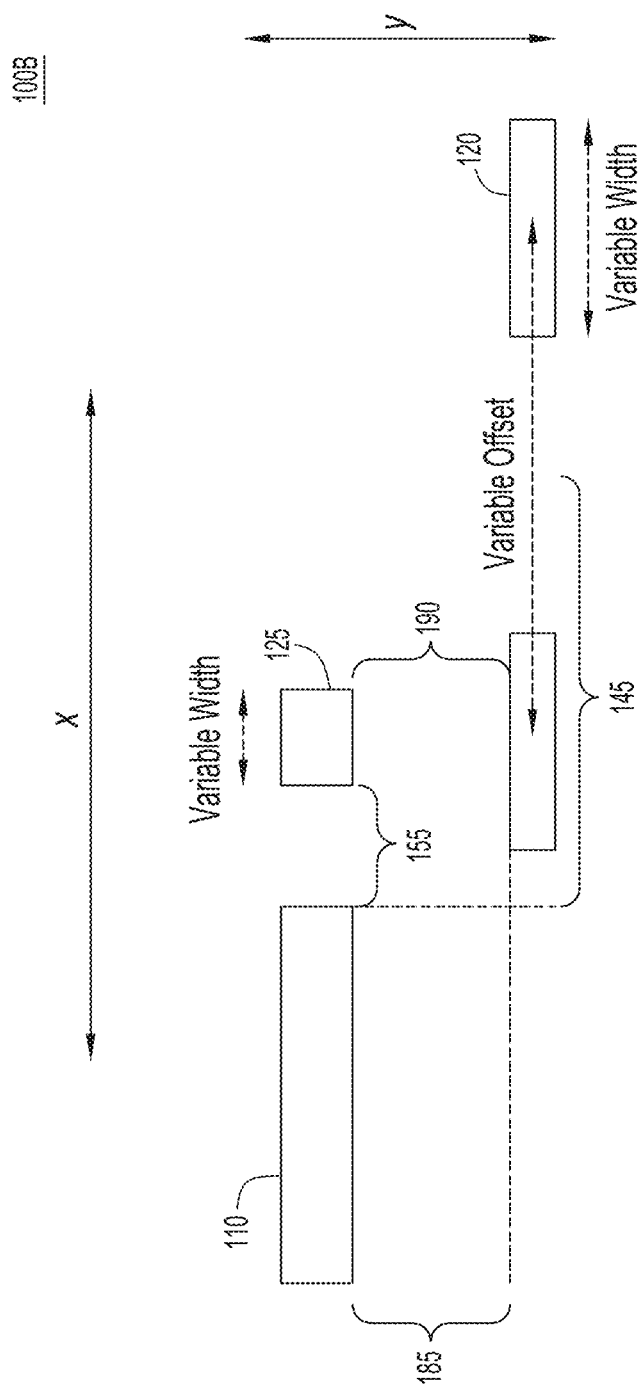

With continuing reference to FIG. 1A, FIG. 1B illustrates example cross-sectional view 100B of PBS 105. In cross-sectional view 100B, the TM0 and TE0 mode signals shown in FIG. 1A may propagate out of the page. FIG. 1B denotes the second transverse direction of PBS 105 as 'y.' Layer 120 is offset from waveguide 110 in the second transverse direction by gap 185. Layer 125 is offset from waveguide 110 in the second transverse direction by gap 190. In one example, gap 185 and gap 190 may have the same value.

Figure 2:
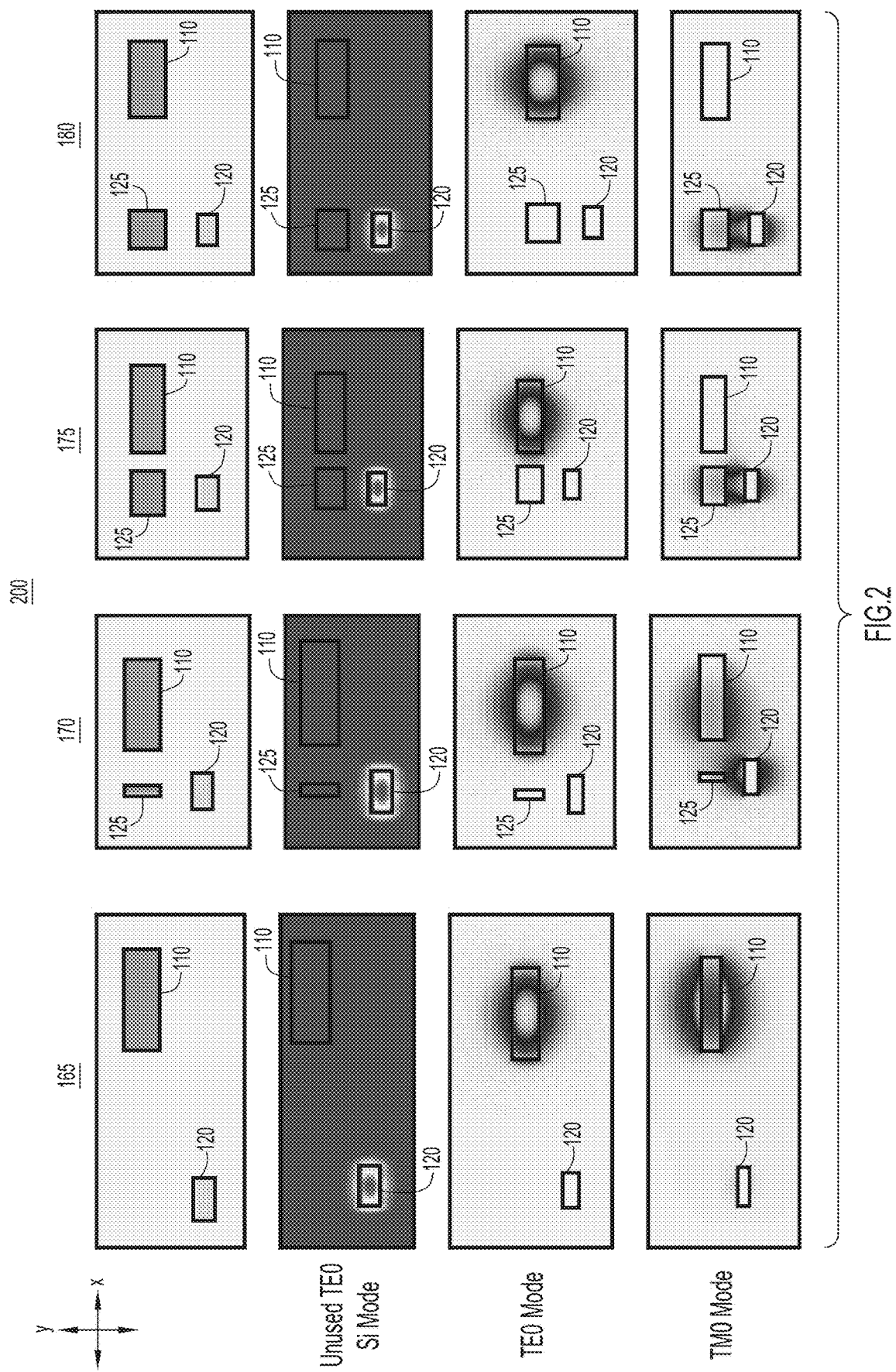
FIG. 2 illustrates a matrix of longitudinal cross-sections of a PBS that demonstrate how the PBS splits light, according to an example embodiment.

With continuing reference to FIG. 1A, FIG. 2 illustrates matrix 200 of longitudinal cross-sections 165, 170, 175, and 180. Matrix 200 demonstrates how PBS 105 splits the combined TE0/TM0 mode signal carried in waveguide 110 into a TM0 mode signal carried in layer 125 and a TE0 mode signal carried in waveguide 110. Longitudinal cross-sections 165, 170, 175, and 180 are oriented such that the TM0 and TE0 mode signals shown in FIG. 1A propagate into the page. It will be appreciated that longitudinal cross-sections 165, 170, 175, and 180 shown in matrix 200 may not be exactly to scale.

From left-to-right, each column corresponds to a respective longitudinal cross-section 165, 170, 175, and 180. The top row illustrates the cross-sectional shapes of waveguide 110, layer 120, and layer 125 at longitudinal cross-sections 165, 170, 175, and 180. The second row illustrates a heat map of an unused TE Si mode that exists independently from (and does not interfere with) the polarization splitting operation at longitudinal cross-sections 165, 170, 175, and 180. As shown, the unused TE Si mode signal remains in layer 120 as the signal propagates through PBS 105. The third row illustrates a heat map of the TE0 mode signal at longitudinal cross-sections 165, 170, 175, and 180. The bottom row illustrates a heat map of the TM0 mode signal at longitudinal cross-sections 165, 170, 175, and 180.

With reference to the third and bottom rows, in longitudinal cross-section 165, the TE0 and TM0 mode signals are provided in waveguide 110. The TE0 mode signal is polarized in the first transverse direction (e.g., horizontally in FIG. 2), and the TM0 mode signal is polarized in the second transverse direction (e.g., vertically in FIG. 2). Layer 120 has not yet fully approached waveguide 110 in the first transverse direction (e.g., gap 145 is relatively large). Layer 120 may gradually approach waveguide 110, instead of being introduced closer to waveguide 110, to prevent the TE0 and TM0 mode signals from scattering off the tip of layer 120. Layer 125 has not yet been introduced at this portion of PBS 105.

In longitudinal cross-section 170, layer 125 has fully approached waveguide 110 in the first transverse direction. Also, layer 120 has been introduced. The width in the first transverse direction of layer 125 is relatively small. The width in the first transverse direction of layer 120 may be unchanged from the width in the first transverse direction of layer 120 at longitudinal cross-section 165.

Because the TE0 mode signal is polarized in the first transverse direction, and because the width in the first transverse direction of waveguide 110 is greater than the width in the first transverse direction of layer 125, the TE0 mode signal may remain in waveguide 110. However, because the TM0 mode signal is polarized in the second transverse direction, and because the thickness in the second transverse direction of waveguide 110 is less than the thickness in the second transverse direction of waveguide 115, the TM0 mode signal may begin to shift to waveguide 115.

In longitudinal cross-section 175, the width in the first transverse direction of layer 125 is greater than the width in the first transverse direction of layer 125 at longitudinal cross-section 170. The width in the first transverse direction of layer 120 may be unchanged from the width in the first transverse direction of layer 120 at longitudinal cross-section 170.

The TE0 mode signal may continue to remain in waveguide 110 because the TE0 mode signal is polarized in the first transverse direction, and the width in the first transverse direction of waveguide 110 is greater than the width in the first transverse direction of layer 125. Meanwhile, the TM0 mode signal may fully shift to waveguide 115 because the TM0 mode signal is polarized in the second transverse direction, and the thickness in the second transverse direction of waveguide 110 is less than the thickness in the second transverse direction of waveguide 115.

In longitudinal cross-section 180, waveguide 110 begins to branch away from waveguide 115 in the longitudinal direction, carrying the TE0 mode signal as a first output. The TM0 mode signal is carried in waveguide 115 as a second output. As waveguide 110 continues to branch away from waveguide 115 in the longitudinal direction, the width in the first transverse direction of layer 125 will continue to increase, and the width in the first transverse direction of layer 120 will decrease to zero. At that point, the TM0 mode signal will be fully captured in layer 125. In one example, when the width in the first transverse direction of layer 120 becomes zero, the width in the first transverse direction of layer 125 may cease increasing and remain at a constant width that is approximately equal to the width in the first transverse direction of waveguide 110.

Thus, PBS 105 may achieve polarization splitting by introducing waveguide 115 adjacent to waveguide 110. Waveguide 115—which includes layers 120 and 125 as stacked layers—may be relatively narrow compared to waveguide 110, which includes a single layer. PBS 105 may be fully/optimally adiabatic; that is, PBS 105 may adiabatically isolate TE- and TM-polarized light into waveguides 110 and 115. PBS 105 may have one single mode SiN waveguide input (e.g., waveguide 110) and two single mode SiN outputs (e.g., waveguides 110 and 115).

PBS 105 may be capable of high power handling, even if layer 120 is a Si layer. Because layer 120 remains sufficiently thin in the first transverse direction, the TE mode signal does not shift to layer 120, and the TM mode signal does not localize in layer 120. Also, gap 190 (between layers 120 and 125) may prevent layers 120 and 125 from becoming too closely coupled, and may thereby help layer 125 to capture the TM mode signal from layer 120.

Because little or none of the TE or TM mode signals remain confined within layer 120, PBS 105 may be configured for high power handling (e.g., as a high power TE0/TM0 splitter). PBS 105 may be capable of handling TM mode signals of over 12.9 dB, which is more than 19.5 times what a traditional PBS could handle. Furthermore, PBS 105 may be capable of handling TE mode signals of over 20 dB, which is more than 100 times what a traditional PBS could handle. As a result, Insertion Loss (IL) of PBS 105 may be minimized and PBS 105 may be capable of adiabatic broadband operation.

Figure 3:
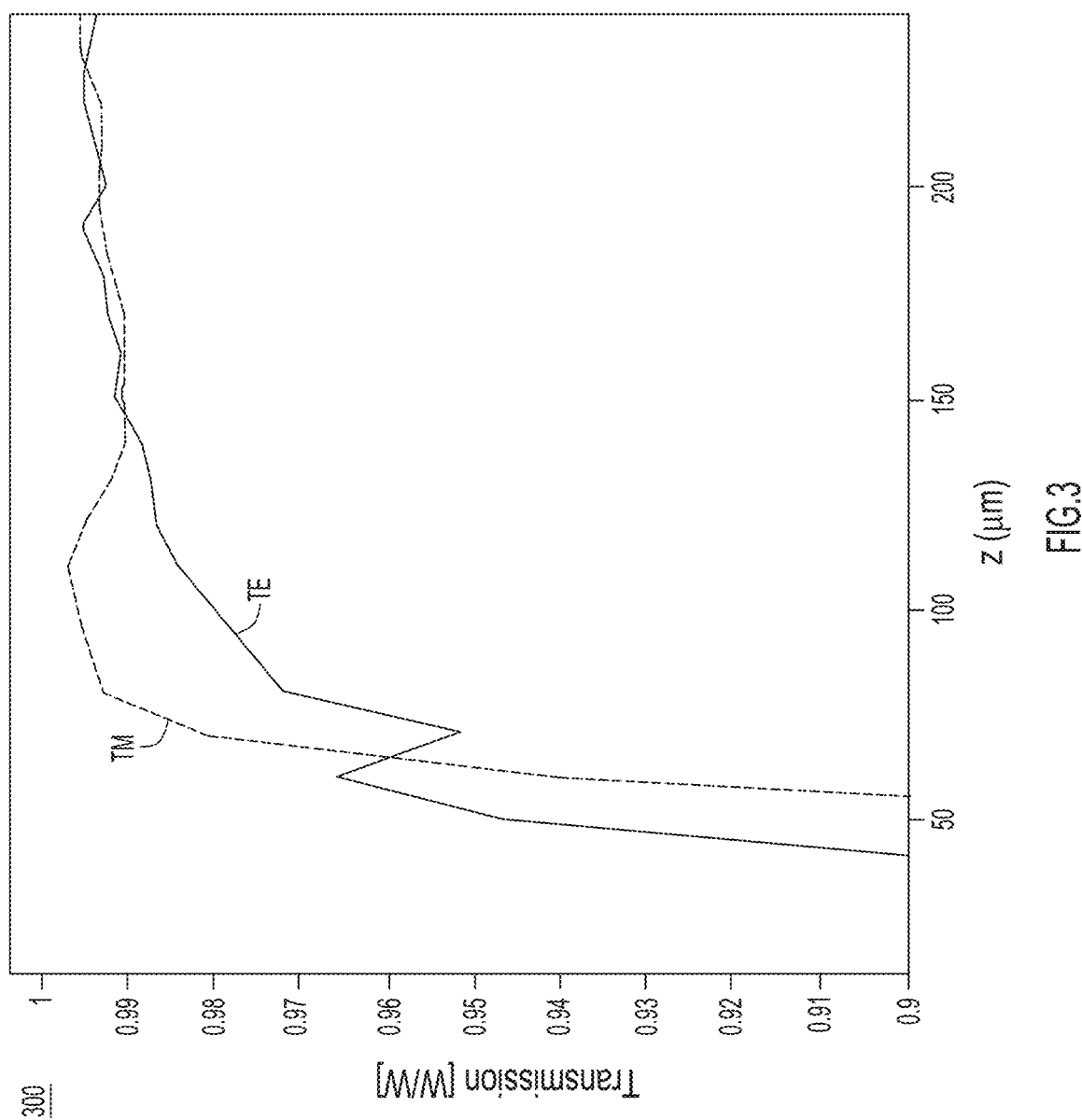
FIG. 3 illustrates a graph of TE and TM mode signal transmission over a longitudinal length of a PBS, according to an example embodiment.

With continuing reference to FIG. 1A, FIG. 3 illustrates an example graph 300 of TE and TM mode signal transmission over the longitudinal length of PBS 105. Graph 300 is based on an EigenMode Expansion (EME) simulation. The x-axis of graph 300 represents the longitudinal length of PBS 105 in microns and the y-axis of graph 300 represents the fraction of the TE or TM mode signal that is successfully transmitted. Graph 300 suggests that a longitudinal length of at least approximately 150 µm may be sufficient, but it will be appreciated that PBS 105 may be any suitable longitudinal length.

Figure 4B:
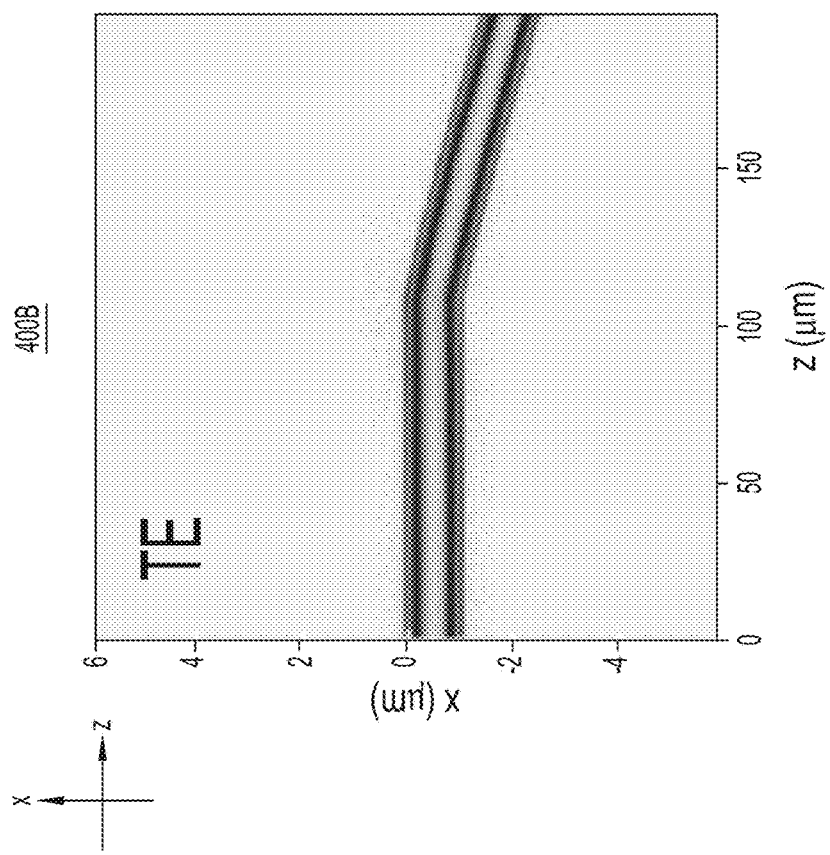
FIGS. 4A and 4B illustrate graphs of TM and TE mode signal behavior over a longitudinal length of a PBS, according to an example embodiment.
Figure 4A:
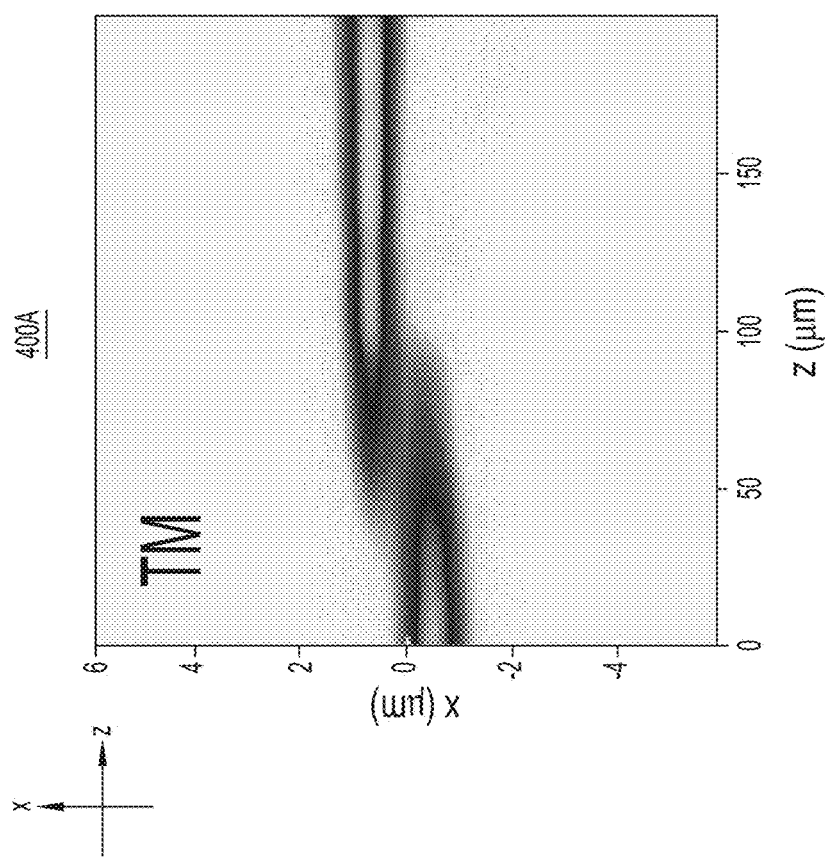

With continuing reference to FIG. 1A, FIG. 4A illustrates graph 400A, which demonstrates of the behavior of the TM mode signal over the longitudinal length of PBS 105. FIG. 4B illustrates graph 400B, which demonstrates of the behavior of the TE mode signal over the longitudinal length of PBS 105. Graphs 400A and 400B are based on an EME simulation. The x-axis of graphs 400A and 400B represents the longitudinal length of PBS 105 in microns and the y-axis of graphs 400A and 400B represents the first transverse direction in microns. Graphs 400A and 400B have the same orientation as cross-sectional view 100A.

Graph 400A illustrates a heat map of the TM mode signal, and graph 400B illustrates a heat map of the TE mode signal. As shown, the TM mode signal shifts from waveguide 110 to waveguide 115 over the longitudinal length of PBS 105. Meanwhile, the TE mode signal remains in waveguide 110 over the longitudinal length of PBS 105.

Figure 5:
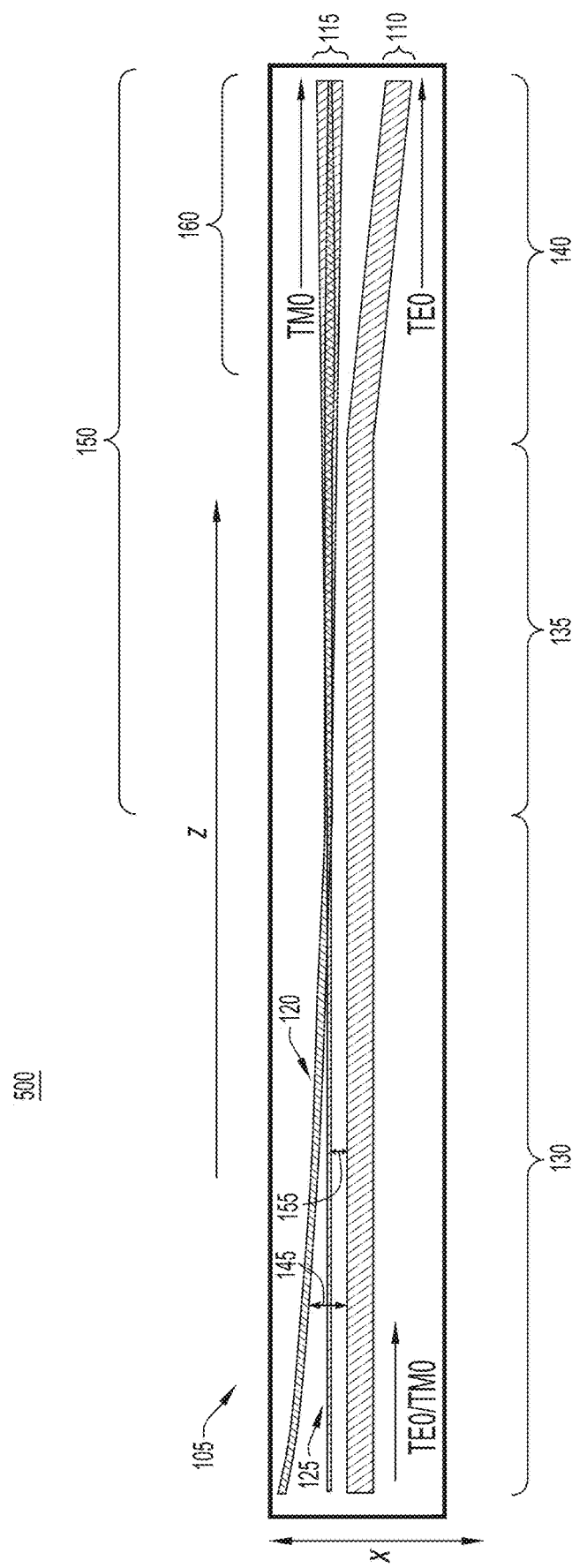
FIG. 5 illustrates a cross-sectional view of a variation of a PBS featuring an extended tip introduction configured to reduce Insertion Loss (IL), according to an example embodiment.
Figure 6:
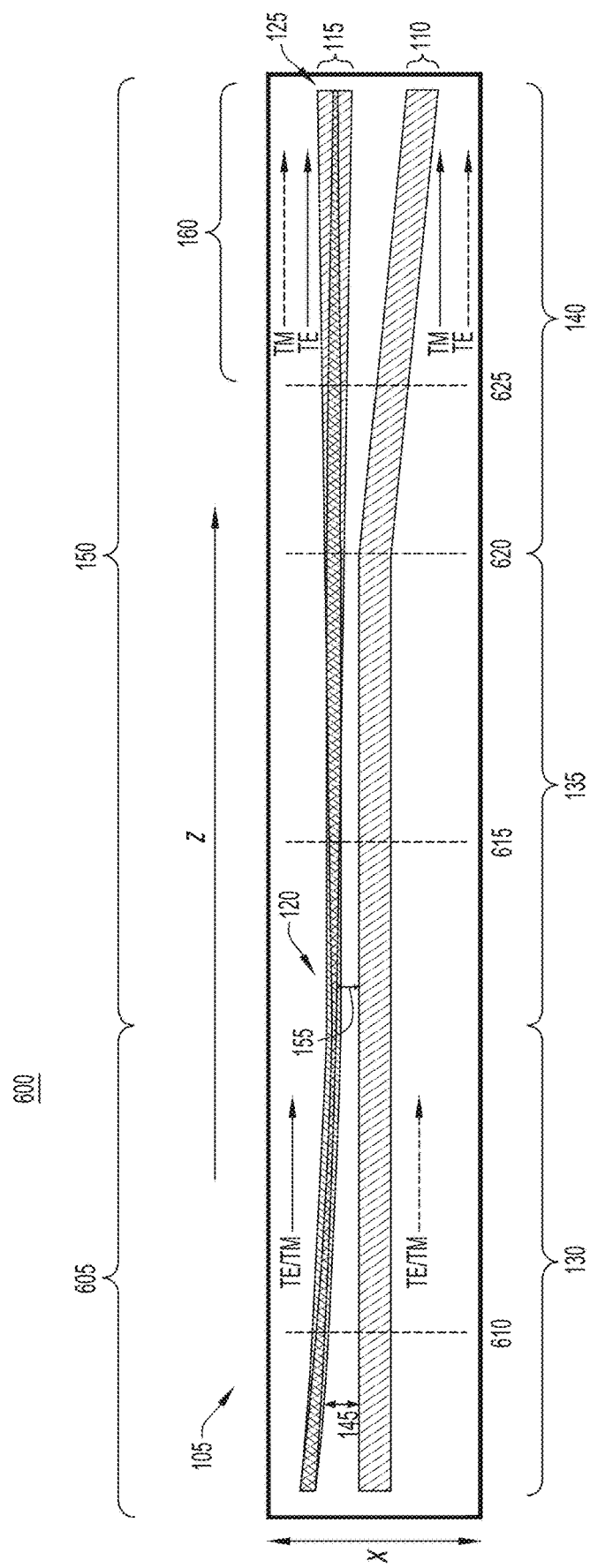
FIG. 6 illustrates a cross-sectional view of a variation of a PBS configured to provide two-input/two-output functionality, according to an example embodiment.

With continuing reference to FIG. 1A, FIGS. 5 and 6 illustrate respective variations of PBS 105. Both variations will be discussed in greater detail below; however, both variations introduce layer 125 before (e.g., in cross-sectional view 100A, to the left of) the border of longitudinal segments 130 and 135. More specifically, in longitudinal segment 130, layer 125 is offset from waveguide 110 in the first transverse direction by gap 155 and is offset from the layer 120 in the second transverse direction by gap 190.

FIG. 5 illustrates cross-sectional view 500 of a variation of PBS 105 featuring an extended tip introduction. Cross-sectional view 500 has the same orientation as cross-sectional view 100A. By way of explanation, in FIG. 1A, the tip of layer 125 may cause back-reflections at the border of longitudinal segments 130 and 135; this variation may further reduce IL caused by those back-reflections by introducing layer 125 before the border of longitudinal segments 130 and 135. As shown, in longitudinal segment 130, layer 125 is longitudinally oriented. In another example, layer 125 may gradually approach waveguide 110 in the first transverse direction, e.g., aligned with layer 120 in the second transverse direction. Other embodiments may be envisioned.

FIG. 6 illustrates cross-sectional view 600 of a variation of PBS 105 configured to provide two-input/two-output functionality. That is, this variation may have two inputs (e.g., waveguides 110 and 115) and two outputs (e.g., waveguides 110 and 115). Cross-sectional view 600 has the same orientation as cross-sectional view 100A.

As shown, in longitudinal segment 130, layer 125 gradually approaches waveguide 110 in the first transverse direction and includes a length portion 605 having a width in the first transverse direction that gradually decreases along longitudinal segment 130. In this example, layer 125 may gradually approach waveguide 110 in the first transverse direction, e.g., aligned with layer 120 in the second transverse direction.

FIG. 6 also shows longitudinal cross-sections 610, 615, 620, and 625. Longitudinal cross-section 610 is in longitudinal segment 130; longitudinal cross-section 615 is in longitudinal segment 135; longitudinal cross-section 620 is at the border of longitudinal segments 135 and 140; and longitudinal cross-section 625 is in longitudinal segment 140. Longitudinal cross-sections 610, 615, 620, and 625 are discussed in greater detail below in connection with FIG. 7.

In one example, waveguide 110 may be provided with a first TE mode signal and a first TM mode signal, and waveguide 115 may be provided with a second TE mode signal and a second TM mode signal. The first TE mode and first TM mode signals may be split such that waveguide 110 carries the first TE mode signal and waveguide 115 carries the first TM mode signal. Similarly, the second TE mode and second TM mode signals may be split such that waveguide 110 carries the second TM mode signal and waveguide 115 carries the second TE mode signal. Thus, the first and second TM mode signals may be switched in waveguides 110 and 115.

Figure 7:
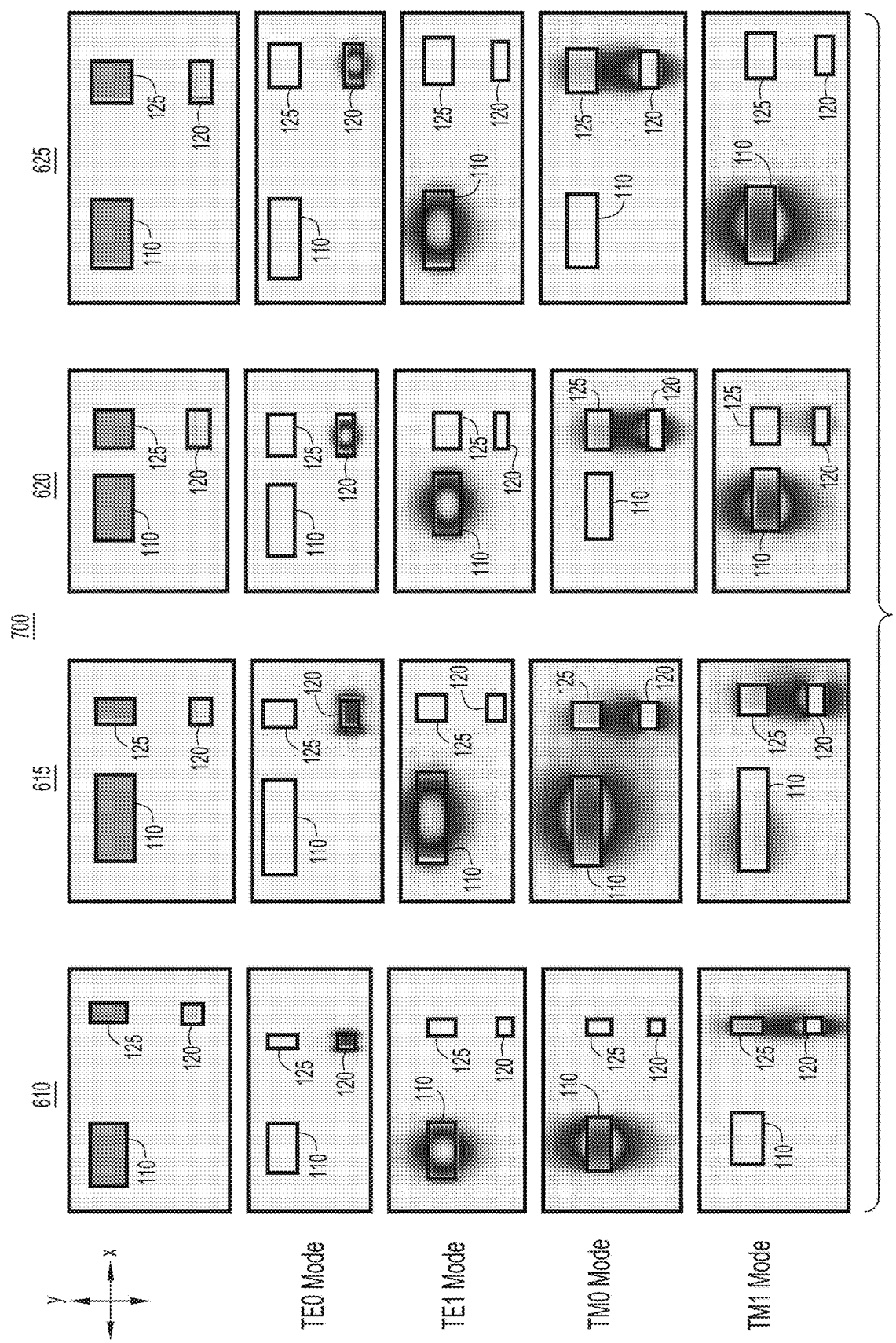
FIG. 7 illustrates a matrix of longitudinal cross-sections of a PBS that demonstrate how the PBS splits light to provide two-input/two-output functionality, according to an example embodiment.

With continuing reference to FIG. 6, FIG. 7 illustrates matrix 700 of longitudinal cross-sections 610, 615, 620, and 625. Matrix 700 demonstrates how a combined TE0/TM1 mode signal carried in waveguide 115 may be split into a TE0 mode signal carried in waveguide 115 and a TM1 mode signal carried in waveguide 110, while a combined TM0/TE1 mode signal carried in waveguide 110 may be split into a TE1 mode signal carried in waveguide 110 and a TM0 mode signal carried in waveguide 115. Longitudinal cross-sections 610, 615, 620, and 625 are oriented such that the TM and TE mode signals shown in FIG. 6 propagate out of the page. It will be appreciated that longitudinal cross-sections 610, 615, 620, and 625 shown in matrix 700 may not be exactly to scale.

From left-to-right, each column corresponds to a respective longitudinal cross-section 610, 615, 620, and 625. The top row illustrates the cross-sectional shapes of waveguide 110, layer 120, and layer 125 at longitudinal cross-sections 610, 615, 620, and 625. The second row illustrates a heat map of the TE0 mode signal at longitudinal cross-sections 610, 615, 620, and 625. The third row illustrates a heat map of the TE1 mode signal at longitudinal cross-sections 610, 615, 620, and 625. The fourth row illustrates a heat map of the TE0 mode signal at longitudinal cross-sections 610, 615, 620, and 625. The bottom row illustrates a heat map of the TM1 mode signal at longitudinal cross-sections 610, 615, 620, and 625.

With reference to the second, third, fourth, and bottom rows, in longitudinal cross-section 610, the TE1 and TM0 mode signals are provided in waveguide 110, and the TE0 and TM1 signals are provided in waveguide 115. Layers 120 and 125 have not yet fully approached waveguide 110 in the first transverse direction (e.g., gap 145 is relatively large).

In longitudinal cross-section 615, layers 120 and 125 have fully approached waveguide 110 in the first transverse direction. The width in the first transverse direction of layer 120 may be unchanged from the width in the first transverse direction of layer 120 at longitudinal cross-section 610. As shown, the TE0 mode signal may remain in layer 120, and the TE1 mode signal may remain in waveguide 110. However, the TM0 mode signal may begin to shift to waveguide 115, and the TM1 mode signal may begin to shift to waveguide 110.

In longitudinal cross-section 620, the width in the first transverse direction of layer 125 is greater than the width in the first transverse direction of layer 125 at longitudinal cross-section 615. The width in the first transverse direction of layer 120 may be unchanged from the width in the first transverse direction of layer 120 at longitudinal cross-section 615. As shown, the TE0 mode signal may continue to remain in layer 120, and the TE1 mode signal may continue to remain in waveguide 110. Meanwhile, the TM0 mode signal may fully shift to waveguide 115, and the TM1 mode signal may fully shift to waveguide 110.

In longitudinal cross-section 625, waveguide 110 begins to branch away from waveguide 115 in the longitudinal direction, carrying a combined TE1/TM1 mode signal as a first output. A combined TE0/TM0 mode signal is carried in waveguide 115 as a second output. As waveguide 110 continues to branch away from waveguide 115 in the longitudinal direction, the width in the first transverse direction of layer 125 will continue to increase, and the width in the first transverse direction of layer 120 decreases to zero. At that point, the combined TE0/TM0 mode signal will be fully captured in layer 125.

To support both the TM0 and TM1 mode signals, the total longitudinal length of the two-input/two-output variation may be longer than that of PBS 105. This is because the TM0 mode signal may be closely matched in index to the TM1 mode signal. PBS 105 and/or other variants described herein may ensure that TM1 mode signal is cut-off to prevent strong coupling between the TM0 and TM1 mode signals. The two-input/two-output variation may be capable of high power handling for the TE0, TE1, TM0, and/or TM1 mode signals. In one specific example, layer 120 in may be implemented as an SiN layer to provide high power handling capabilities for the TE0 mode signal.

Figure 8:
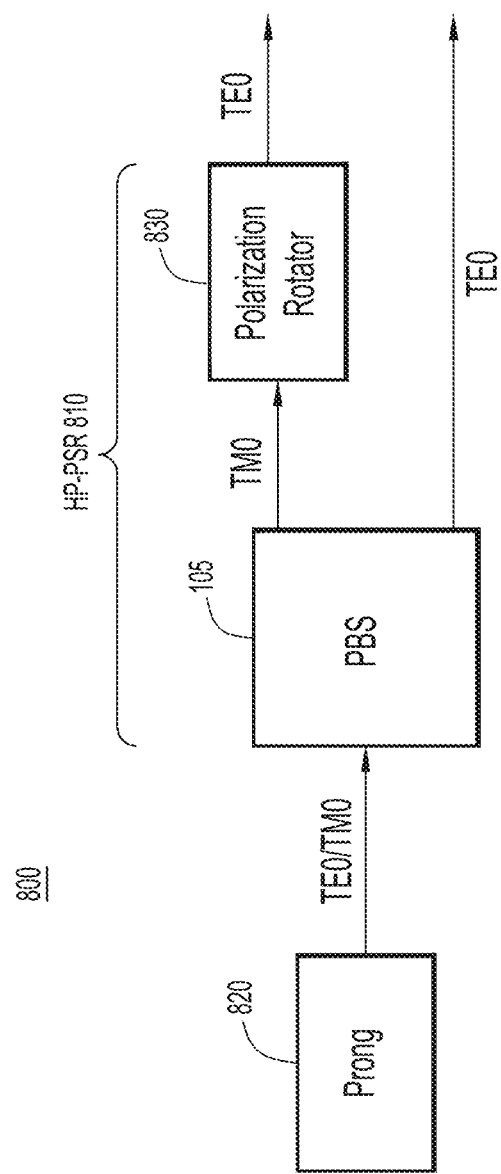
FIGS. 8-10 illustrate respective use cases for a PBS and/or one or more variations of the PBS, according to an example embodiment.
Figure 9:
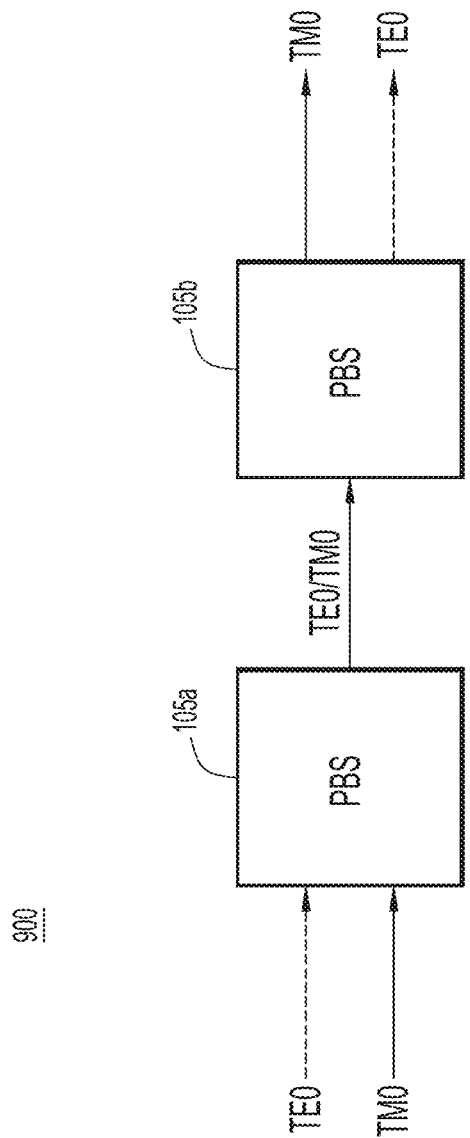
Figure 10:
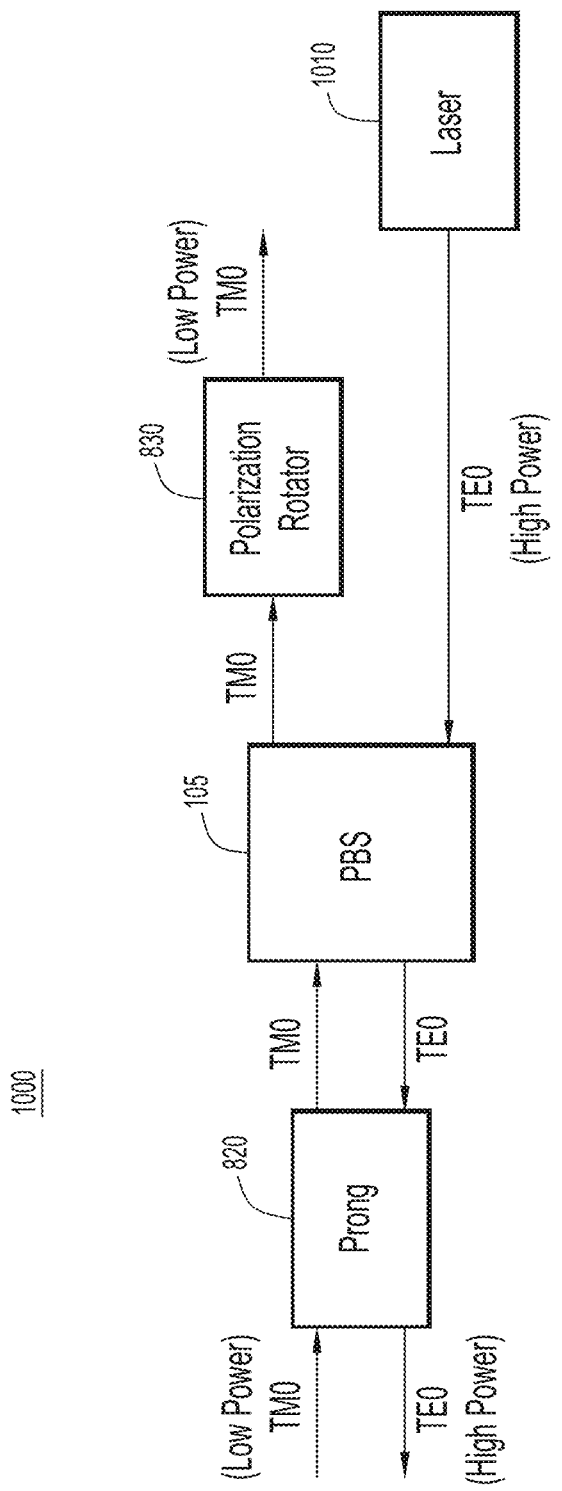

FIGS. 8-10 illustrate respective use cases for a PBS and/or one or more variations thereof. FIG. 8 illustrates a first use case in which PBS 105 is used in conjunction with a Polarization Splitter-Rotator (PSR) to form a high-power PSR. FIG. 9 illustrates a second use case in which two back-to-back PBSs 105a and 105b are used as a high power TE/TM waveguide crossing. FIG. 10 illustrates a third use case in which PBS 105 is used to generate a polarization bidirectional Input/Output (I/O). While PBS 105 (and/or PBSs 105a and 105b) are shown in FIGS. 8-10, it will be appreciated that any suitable PBS or variation thereof may be used. Other use cases may be envisioned.

FIG. 8 illustrates an example system 800 configured to form high-power PSR 810. System 800 includes prong 820, PBS 105, and polarization rotator 830. PBS 105 and polarization rotator 830 make up high-power PSR 810. In this example, polarization rotator 830 may experience issues with high power handling for TE0 mode signals. PBS 105 may prevent the TE0 mode signal from passing through polarization rotator 830 to mitigate the TE power handling limitations of polarization rotator 830. As a result, high-power PSR 810 may be an efficient PSR configured to enable increased fiber datalink range.

More specifically, prong 820 provides a combined TE0/TM0 mode signal to PBS 105. PBS 105, which in this example functions as a TE0/TM0 splitter, may strip the TE0 mode signal from the combined TE0/TM0 mode signal. PBS 105 outputs the TM0 mode signal to polarization rotator 830 and further outputs the TE0 mode signal elsewhere (e.g., to another component in system 800). Polarization rotator 830 may rotate the polarization of the TM0 mode signal to produce another TE0 mode signal.

FIG. 9 illustrates an example system 900 configured to form a high power TE/TM waveguide crossing. System 900 includes PBSs 105a and 105b, which may be identical or similar to PBS 105 and/or one or more variations described herein. In one example, PBS 105a obtains a TE0 mode signal as a first input and a TM0 mode signal as a second input. PBS 105a combines the TE0 and TM0 mode signals into a combined TE0/TM0 mode signal. PBS 105a provides the combined TE0/TM0 mode signal to PBS 105b. PBS 105b splits the combined TE0/TM0 mode signal into the TM0 mode signal and the TE0 mode signal. PBS 105b provides the TM0 mode signal as a first output and the TE0 mode signal as a second output. The net result is that system 900 has switched the TE0 mode signal and the TM0 mode signal.

FIG. 10 illustrates an example system 1000 configured to form a polarization bidirectional I/O. System 1000 includes prong 820, PBS 105, polarization rotator 830, and laser 1010. A low-power TM0 mode signal propagates from prong 820, to PBS 105, to polarization rotator 830. Polarization rotator 830 may rotate the polarization of the low-power TM0 mode signal to produce a low-power TE0 mode signal. Polarization rotator 830 may output the low-power TE0 mode signal. Also, laser 1010 may produce a high-power TE0 mode signal that propagates from laser 1010, to PBS 150, to prong 820. Prong 820 may output the high-power TE0 mode signal. Thus, as shown, PBS 105 may be used in both transmitter and receiver circuits to increase power handling.

Figure 11:
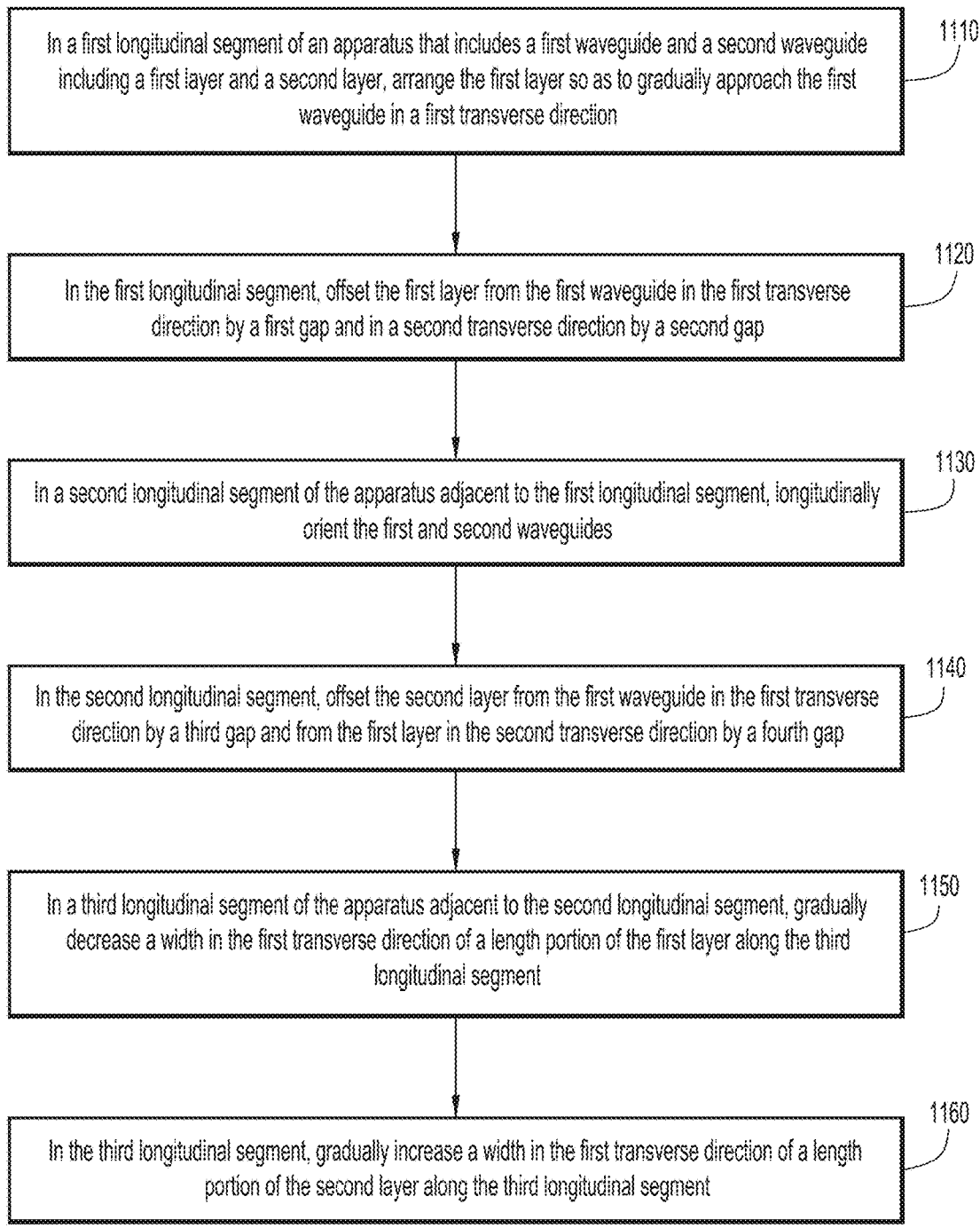
FIG. 11 illustrates a flowchart of a method for performing functions associated with operations discussed herein, according to an example embodiment.

FIG. 11 is a flowchart of an example method 1100 for performing functions associated with operations discussed herein. Operation 1110 involves, in a first longitudinal segment of an apparatus that includes a first waveguide and a second waveguide including a first layer and a second layer, gradually approaching, by the first layer, the first waveguide in a first transverse direction. Operation 1120 involves, in the first longitudinal segment, offsetting the first layer from the first waveguide in the first transverse direction by a first gap and in a second transverse direction by a second gap.

Operation 1130 involves, in a second longitudinal segment of the apparatus adjacent to the first longitudinal segment, longitudinally orienting the first and second waveguides. Operation 1140 involves, in the second longitudinal segment, offsetting the second layer from the first waveguide in the first transverse direction by a third gap and from the first layer in the second transverse direction by a fourth gap.

Operation 1150 involves, in a third longitudinal segment of the apparatus adjacent to the second longitudinal segment, gradually decreasing a width in the first transverse direction of a length portion of the first layer along the third longitudinal segment. Operation 1160 involves, in the third longitudinal segment, gradually increasing a width in the first transverse direction of a length portion of the second layer along the third longitudinal segment.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the '(s)' nomenclature (e.g., one or more element(s)).

In one form, an apparatus is provided. The apparatus comprises: a first waveguide; a second waveguide including a first layer and a second layer; and a first longitudinal segment, a second longitudinal segment adjacent to the first longitudinal segment, and a third longitudinal segment adjacent to the second longitudinal segment, wherein: in the first longitudinal segment, the first layer gradually approaches the first waveguide in a first transverse direction, and the first layer is offset from the first waveguide in the first transverse direction by a first gap and in a second transverse direction by a second gap, in the second longitudinal segment, the first and second waveguides are longitudinally oriented, and wherein the second layer is offset from the first waveguide in the first transverse direction by a third gap and is offset from the first layer in the second transverse direction by a fourth gap, and in the third longitudinal segment, the first layer includes a length portion having a width in the first transverse direction that gradually decreases along the third longitudinal segment, and the second layer includes a length portion having a width in the first transverse direction that gradually increases along the third longitudinal segment.

In one example, the first waveguide is a silicon nitride waveguide and the second layer is a silicon nitride layer. In a further example, the first layer is a silicon layer. In another further example, the first layer is another silicon nitride layer.

In one example, in the first longitudinal segment, the second layer is offset from the first waveguide in the first transverse direction by the third gap and is offset from the first layer in the second transverse direction by the fourth gap. In a further example, in the first longitudinal segment, the second layer is longitudinally oriented. In another further example, in the first longitudinal segment, the second layer gradually approaches the first waveguide in the first transverse direction and includes a length portion having a width in the first transverse direction that gradually decreases along the first longitudinal segment.

In one example, the first waveguide is configured to receive a transverse electric mode signal polarized in the first transverse direction and a transverse magnetic mode signal polarized in the second transverse direction, the first waveguide is configured to output the transverse electric mode signal, and the second layer of the second waveguide is configured to output the transverse magnetic mode signal.

In another form, a method is provided. The method comprises: in a first longitudinal segment of an apparatus that includes a first waveguide and a second waveguide including a first layer and a second layer, arranging the first layer so as to gradually approach the first waveguide in a first transverse direction; in the first longitudinal segment, offsetting the first layer from the first waveguide in the first transverse direction by a first gap and in a second transverse direction by a second gap; in a second longitudinal segment of the apparatus adjacent to the first longitudinal segment, longitudinally orienting the first and second waveguides; in the second longitudinal segment, offsetting the second layer from the first waveguide in the first transverse direction by a third gap and from the first layer in the second transverse direction by a fourth gap; in a third longitudinal segment of the apparatus adjacent to the second longitudinal segment, gradually decreasing a width in the first transverse direction of a length portion of the first layer along the third longitudinal segment; and in the third longitudinal segment, gradually increasing a width in the first transverse direction of a length portion of the second layer along the third longitudinal segment.

In another form, another apparatus is provided. The other apparatus comprises: a first waveguide configured to receive a transverse electric mode signal polarized in a first transverse direction and a transverse magnetic mode signal polarized in a second transverse direction and to output the transverse electric mode signal; a second waveguide including a first layer and a second layer configured to output the transverse magnetic mode signal; and a first longitudinal segment, a second longitudinal segment adjacent to the first longitudinal segment, and a third longitudinal segment adjacent to the second longitudinal segment, wherein: in the first longitudinal segment, the first layer gradually approaches the first waveguide in the first transverse direction, the first layer is offset from the first waveguide in the first transverse direction by a first gap and in the second transverse direction by a second gap, and the second layer is offset from the first waveguide in the first transverse direction by a third gap and is offset from the first layer in the second transverse direction by a fourth gap, in the second longitudinal segment, the first and second waveguides are longitudinally oriented, and wherein the second layer is offset from the first waveguide in the first transverse direction by the third gap and is offset from the first layer in the second transverse direction by the fourth gap, and in the third longitudinal segment, the first layer includes a length portion having a width in the first transverse direction that gradually decreases along the third longitudinal segment, and the second layer includes a length portion having a width in the first transverse direction that gradually increases along the third longitudinal segment.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. An apparatus comprising:
    a first waveguide;
    a second waveguide including a first layer and a second layer; and
    a first longitudinal segment, a second longitudinal segment adjacent to the first longitudinal segment, and a third longitudinal segment adjacent to the second longitudinal segment, wherein:
    in the first longitudinal segment, the first layer gradually approaches the first waveguide in a first transverse direction, and the first layer is offset from the first waveguide in the first transverse direction by a first gap and in a second transverse direction by a second gap,
    in the second longitudinal segment, the first and second waveguides are longitudinally oriented, and wherein the second layer is offset from the first waveguide in the first transverse direction by a third gap and is offset from the first layer in the second transverse direction by a fourth gap, and
    in the third longitudinal segment, the first layer includes a length portion having a width in the first transverse direction that gradually decreases along a first longitudinal direction, and the second layer includes a length portion having a width in the first transverse direction that gradually increases along the first longitudinal direction.

2. The apparatus of claim 1, wherein the first waveguide is a silicon nitride waveguide and the second layer is a silicon nitride layer.

3. The apparatus of claim 2, wherein the first layer is a silicon layer.

4. The apparatus of claim 2, wherein the first layer is another silicon nitride layer.

5. The apparatus of claim 1, wherein, in the first longitudinal segment, the second layer is offset from the first waveguide in the first transverse direction by the third gap and is offset from the first layer in the second transverse direction by the fourth gap.

6. The apparatus of claim 5, wherein, in the first longitudinal segment, the second layer is longitudinally oriented.

7. The apparatus of claim 5, wherein, in the first longitudinal segment, the second layer gradually approaches the first waveguide in the first transverse direction and includes a length portion having a width in the first transverse direction that gradually decreases along the first longitudinal segment.

8. The apparatus of claim 1, wherein the first waveguide is configured to receive a transverse electric mode signal polarized in the first transverse direction and a transverse magnetic mode signal polarized in the second transverse direction, the first waveguide is configured to output the transverse electric mode signal, and the second layer of the second waveguide is configured to output the transverse magnetic mode signal.

9. A method comprising:
    in a first longitudinal segment of an apparatus that includes a first waveguide and a second waveguide including a first layer and a second layer, arranging the first layer so as to gradually approach the first waveguide in a first transverse direction;
    in the first longitudinal segment, offsetting the first layer from the first waveguide in the first transverse direction by a first gap and in a second transverse direction by a second gap;
    in a second longitudinal segment of the apparatus adjacent to the first longitudinal segment, longitudinally orienting the first and second waveguides;
    in the second longitudinal segment, offsetting the second layer from the first waveguide in the first transverse direction by a third gap and from the first layer in the second transverse direction by a fourth gap;
    in a third longitudinal segment of the apparatus adjacent to the second longitudinal segment, gradually decreasing a width in the first transverse direction of a length portion of the first layer along a first longitudinal direction; and
    in the third longitudinal segment, gradually increasing a width in the first transverse direction of a length portion of the second layer along the first longitudinal direction.

10. The method of claim 9, further comprising:
    in the first longitudinal segment, offsetting the second layer from the first waveguide in the first transverse direction by the third gap and from the first layer in the second transverse direction by the fourth gap.

11. The method of claim 10, further comprising:
    in the first longitudinal segment, longitudinally orienting the second layer.

12. The method of claim 10, further comprising:
    in the first longitudinal segment, arranging the second layer so as to gradually approach the first waveguide in the first transverse direction; and
    in the first longitudinal segment, gradually decreasing a width in the first transverse direction of a length portion of the second layer along the first longitudinal segment.

13. The method of claim 9, further comprising:
    providing, in the first waveguide, a transverse electric mode signal polarized in the first transverse direction;

providing, in the first waveguide, a transverse magnetic mode signal polarized in the second transverse direction; and obtaining the transverse electric mode signal in the first waveguide and the transverse magnetic mode signal in the second layer of the second waveguide.

14. An apparatus comprising:

a first waveguide configured to receive a transverse electric mode signal polarized in a first transverse direction and a transverse magnetic mode signal polarized in a second transverse direction and to output the transverse electric mode signal;

a second waveguide including a first layer and a second layer configured to output the transverse magnetic mode signal; and a first longitudinal segment, a second longitudinal segment adjacent to the first longitudinal segment, and a third longitudinal segment adjacent to the second longitudinal segment, wherein:

in the first longitudinal segment, the first layer gradually approaches the first waveguide in the first transverse direction, the first layer is offset from the first waveguide in the first transverse direction by a first gap and in the second transverse direction by a second gap, and the second layer is offset from the first waveguide in the first transverse direction by a third gap and is offset from the first layer in the second transverse direction by a fourth gap, in the second longitudinal segment, the first and second waveguides are longitudinally oriented, and wherein the second layer is offset from the first waveguide in the first transverse direction by the third gap and is offset from the first layer in the second transverse direction by the fourth gap, and in the third longitudinal segment, the first layer includes a length portion having a width in the first transverse direction that gradually decreases along a first longitudinal direction, and the second layer includes a length portion having a width in the first transverse direction that gradually increases along the first longitudinal direction.

15. The apparatus of claim 14, wherein the first waveguide is a silicon nitride waveguide.

16. The apparatus of claim 15, wherein the second layer is a silicon nitride layer.

17. The apparatus of claim 16, wherein the first layer is a silicon layer.

18. The apparatus of claim 16, wherein the first layer is another silicon nitride layer.

19. The apparatus of claim 14, wherein, in the first longitudinal segment, the second layer is longitudinally oriented.

20. The apparatus of claim 14, wherein, in the first longitudinal segment, the second layer gradually approaches the first waveguide in the first transverse direction and includes a length portion having a width in the first transverse direction that gradually decreases along the first longitudinal segment.

* * * * *